United States Patent
Bliemeister et al.

(10) Patent No.: US 8,643,243 B2
(45) Date of Patent: Feb. 4, 2014

(54) APPARATUS AND METHOD FOR ELECTRICALLY INSULATING END TURNS OF A STATOR ASSEMBLY

(75) Inventors: Allan J. Bliemeister, Fond du Lac, WI (US); Richard D. Van Maaren, Sheboygan Falls, WI (US); James D. Spangle, Sheboygan, WI (US); Paul L. Dreiling, Manitowoc, WI (US); Louis M. Atsinger, Manitowoc, WI (US)

(73) Assignee: Kohler Co., Kohler, WI (US)

( * ) Notice: Subject to any disclaimer, the term of this patent is extended or adjusted under 35 U.S.C. 154(b) by 309 days.

(21) Appl. No.: 12/696,469

(22) Filed: Jan. 29, 2010

(65) Prior Publication Data

US 2011/0148244 A1    Jun. 23, 2011

Related U.S. Application Data

(60) Provisional application No. 61/289,577, filed on Dec. 23, 2009.

(51) Int. Cl.
    *H02K 3/38*            (2006.01)
(52) U.S. Cl.
    USPC .......................................... 310/214; 310/215
(58) Field of Classification Search
    USPC .......... 310/179, 194, 214, 215, 216.114, 260, 310/270
    IPC ....................................................... H02K 3/38
    See application file for complete search history.

(56) References Cited

U.S. PATENT DOCUMENTS

| | | | | | |
|---|---|---|---|---|---|
| 2,615,944 | A | * | 10/1952 | Carlson | 310/166 |
| 2,921,208 | A | * | 1/1960 | Morrill | 310/214 |
| 3,219,857 | A | * | 11/1965 | Fisher | 310/71 |
| 3,349,265 | A | | 10/1967 | Murdock et al. | |
| 3,439,205 | A | * | 4/1969 | Houtman | 310/180 |
| 3,575,623 | A | * | 4/1971 | Stine | 310/260 |
| 3,665,234 | A | * | 5/1972 | Bishop | 310/260 |
| 3,768,152 | A | * | 10/1973 | Swanke et al. | 29/596 |
| 3,909,648 | A | * | 9/1975 | Clark | 310/260 |
| RE28,705 | E | * | 2/1976 | Hoffmeyer | 310/180 |

(Continued)

FOREIGN PATENT DOCUMENTS

| | | |
|---|---|---|
| CH | 312388 | 12/1955 |
| DE | 1156171 | 10/1963 |

(Continued)

OTHER PUBLICATIONS

Eleven pages of International Preliminary Report on Patentability from PCTUS2010058935 a counterpart PCT application, dated Jun. 26, 2012.

(Continued)

*Primary Examiner* — Tran Nguyen
*Assistant Examiner* — Naishadh Desai
(74) *Attorney, Agent, or Firm* — The Belles Group, P.C.

(57) ABSTRACT

An apparatus and method for providing electrical insulation between adjacent end turns at different phases within a stator assembly. In one embodiment, the invention is directed to a stator assembly comprising: a stator core having a plurality of slots; at least two coils of different phases wound on the stator core through the slots and having an end turn that extends from the stator core; and one or more separator members positioned between adjacent end turns of the coils.

17 Claims, 12 Drawing Sheets

(56) References Cited

U.S. PATENT DOCUMENTS

| | | | |
|---|---|---|---|
| 4,263,475 A | 4/1981 | McNeal | |
| 4,335,325 A * | 6/1982 | Miller et al. | 310/214 |
| 4,389,584 A | 6/1983 | Burns | |
| 4,395,991 A | 8/1983 | Miyachi et al. | |
| 4,403,162 A * | 9/1983 | Pallaro | 310/194 |
| 4,507,580 A * | 3/1985 | Obara | 310/214 |
| 4,588,916 A * | 5/1986 | Lis | 310/260 |
| 4,893,041 A * | 1/1990 | Snider et al. | 310/215 |
| 4,922,165 A * | 5/1990 | Crawford et al. | 310/215 |
| 5,093,543 A * | 3/1992 | Patton et al. | 174/138 E |
| 5,659,219 A * | 8/1997 | Momose et al. | 310/260 |
| 5,952,761 A * | 9/1999 | Itoh et al. | 310/215 |
| 6,043,584 A * | 3/2000 | DeHart | 310/260 |
| 6,064,131 A * | 5/2000 | DeHart | 310/198 |
| 6,161,424 A | 12/2000 | Kidokoro et al. | |
| 6,982,504 B2 * | 1/2006 | Brown | 310/36 |
| 7,132,776 B2 | 11/2006 | Tagami et al. | |
| 7,210,214 B2 | 5/2007 | Tagami et | |
| 7,498,710 B2 | 3/2009 | Rao | |
| 7,560,850 B2 | 7/2009 | Uetsuji et al. | |
| 2004/0251761 A1 * | 12/2004 | Hirzel | 310/156.25 |
| 2006/0131987 A1 * | 6/2006 | Uetsuji et al. | 310/270 |
| 2008/0011505 A1 * | 1/2008 | Maddison et al. | 174/146 |
| 2008/0231138 A1 * | 9/2008 | Onimaru et al. | 310/217 |
| 2008/0246362 A1 * | 10/2008 | Hirzel | 310/156.02 |
| 2008/0246364 A1 | 10/2008 | Uetsuji et al. | |
| 2008/0283127 A1 | 11/2008 | Wang et al. | |

FOREIGN PATENT DOCUMENTS

| | | |
|---|---|---|
| DE | 1189599 | 3/1965 |
| JP | 50042121 | 4/1975 |
| JP | 55005465 | 1/1980 |
| JP | 58174150 | 10/1983 |
| WO | WO 9101585 A * | 2/1991 |
| WO | WO9181585 | 2/1991 |

OTHER PUBLICATIONS

Five pages of International Search Report from PCTUS2010058935, a counterpart PCT application, dated Dec. 9, 2011.

* cited by examiner

APPARATUS AND METHOD FOR ELECTRICALLY INSULATING END TURNS OF A STATOR ASSEMBLY

CROSS-REFERENCE TO RELATED PATENT APPLICATIONS

The present application claims the benefit of U.S. Provisional Patent Application Ser. No. 61/289,577, filed Dec. 23, 2009, the entirety of which is hereby incorporated by reference.

FIELD OF THE INVENTION

The present invention relates generally to end turn insulators, and specifically to apparatus and methods for electrically insulating end turns of a multi-phase winding of a stator assembly.

BACKGROUND OF THE INVENTION

Stator assemblies having a multi-phase winding wound about a stator core are well known in the art. For example, in a three phase motor or generator each phase may have one or more groups of coils, and each group may overlap another group. In such an arrangement, windings for different phases are wound through a plurality of slots formed in the stator core to form coils of different phase. The portions of the coils extending from one slot to another along the ends of the stator core form the end turns. In such multi-phase stators, the end turns of the coils of different phases are typically located adjacent to one another. Thus, when the coils are electrically energized, potential differences are developed between the end turns of the coils of different phases. It is, therefore, normal practice to provide an insulating barrier between adjacent end turns of the coils of different phases.

One type of insulating barrier commonly used in the art is an electrically insulating composite paper. This composite paper typically comprises layers of Aramid and Mylar materials in varying thicknesses, depending on the physical and electrical requirements of any given application.

However, in electrical machines heat tends to be generated through, amongst other things, resistance in the coils. The machine rating is often determined by the actual temperature rise of the machine, and thus the cooling efficiency of the construction may help to determine the rating of the machine.

A problem which has been identified in machines which use composite insulating paper between groups of coils is that the composite insulating paper may reduce the cooling efficiency of the machine. This is firstly because the exposed surface area of the coils may be reduced, and secondly because air flow through the coils may be restricted. Moreover, during the manufacturing process, the composite insulating paper may become damaged and/or dislodged.

While recent attempts have been made to increase cooling efficiency, there is still a need for an apparatus that can electrically insulate coils of different phases while affording adequate cooling. This goal is further complicated by the fact that rigidity and compactness of the stator assembly (including the end coils) is desirable during manufacturing to prevent damage to the coils.

SUMMARY OF THE INVENTION

The present invention is directed to an electrically insulating barrier that is positioned between and provides improved thermal cooling of coils of different phases. In one aspect, the invention can be a flexible dielectric sheet having cooling through-holes and/or a separator member constructed of a rigid dielectric material.

In another aspect, the invention can be a stator assembly comprising: a stator core having a plurality of slots; at least two coils of different phases wound on the stator core through the slots and having an end turn that extends from the stator core; one or more electrically insulating sheets comprising a plurality of through holes, the sheets positioned between adjacent end turns of the coils so that the through holes of the sheets form passageways between the adjacent end turns; and one or more separator members positioned between the sheets and the adjacent end turns.

In yet another aspect, the invention can be a stator assembly comprising: a stator core having a plurality of slots; at least two coils of different phases wound on the stator core through the slots and having an end turn that extends from the stator core; one or more electrically insulating sheets comprising a plurality of through holes, the sheets positioned between adjacent end turns of the coils so that the through holes of the sheets form passageways between the adjacent end turns; and one or more cords secured to the sheets and wrapped around at least one of the adjacent end turns.

In still another aspect, the invention can be a separator member for maintaining separation between adjacent end turns of different phase coils of a stator assembly, the separator member comprising: a body portion; a head portion connected to a proximal end of the body portion; and wherein the separator member is constructed of a rigid dielectric material.

In a further aspect, the invention can be an apparatus for electrically insulating adjacent end turns of different phase coils of a stator assembly, the separator member comprising: a flexible dielectric sheet having a plurality of through holes; and one or more flexible dielectric cords laced through the through holes of the sheets, a length of the cords extending from the sheets.

In a yet further aspect, the invention can be a method of electrically insulating adjacent end turns of different phase coils of a stator assembly, the method comprising: a) inserting one or more electrically insulating sheets comprising a plurality of through holes between the adjacent end turns of the stator assembly, the through holes of the sheets forming passageways between the adjacent end turns of the stator assembly; and b) inserting one or more separator members between the sheets and the adjacent end turns.

In a still further aspect, the invention can be a method of electrically insulating adjacent end turns of different phase coils of a stator assembly, the method comprising: a) inserting one or more electrically insulating sheets comprising a plurality of through holes between the adjacent end turns of the stator assembly, the through holes of the sheets forming passageways between the adjacent end turns of the stator assembly; and b) lacing one or more cords through the through holes of the sheets; c) wrapping the cords around at least one of the adjacent end turns; and d) securing the cords.

In another aspect, the invention can be a stator assembly comprising: a stator core having a plurality of slots; at least two coils of different phases wound on the stator core through the slots and having an end turn that extends from the stator core; one or more electrically insulating sheets comprising a plurality of through holes, the sheets positioned between adjacent end turns of the coils so that the through holes of the sheets form passageways between the adjacent end turns; and one or more cords secured to the sheets and wrapped around a plurality of end turns located at different radial distances from an axis of the stator core.

in an even further aspect, the invention can be a stator assembly comprising: a stator core having a plurality of slots; at least two coils of different phases wound on the stator core through the slots and having an end turn that extends from the stator core; and one or more separator members positioned between adjacent end turns of the coils and maintaining space between the adjacent end turns, the separator members constructed of a rigid dielectric material.

DETAILED DESCRIPTION OF THE DRAWINGS

Figure 1:
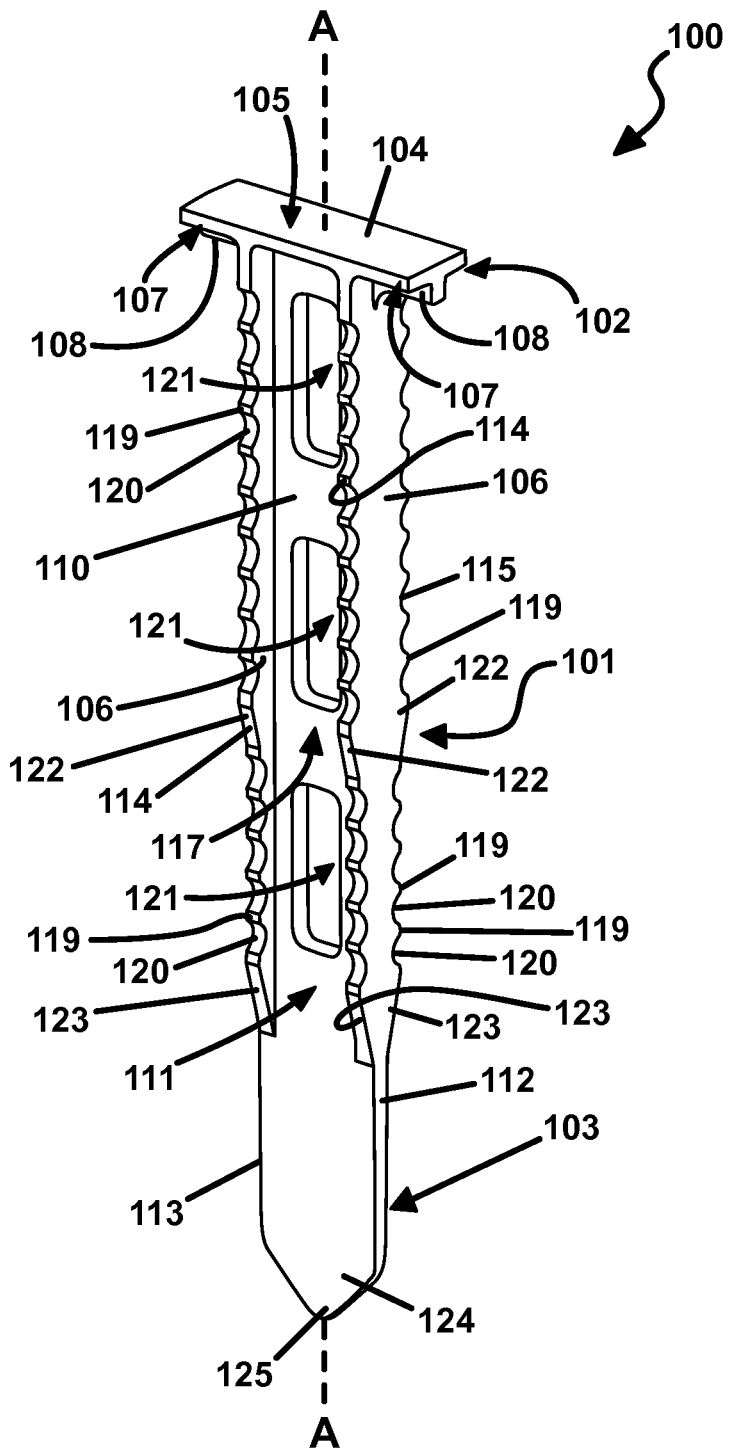
FIG. 1 is an isometric view of a phase separator according to one embodiment of the present invention.
Figure 2:
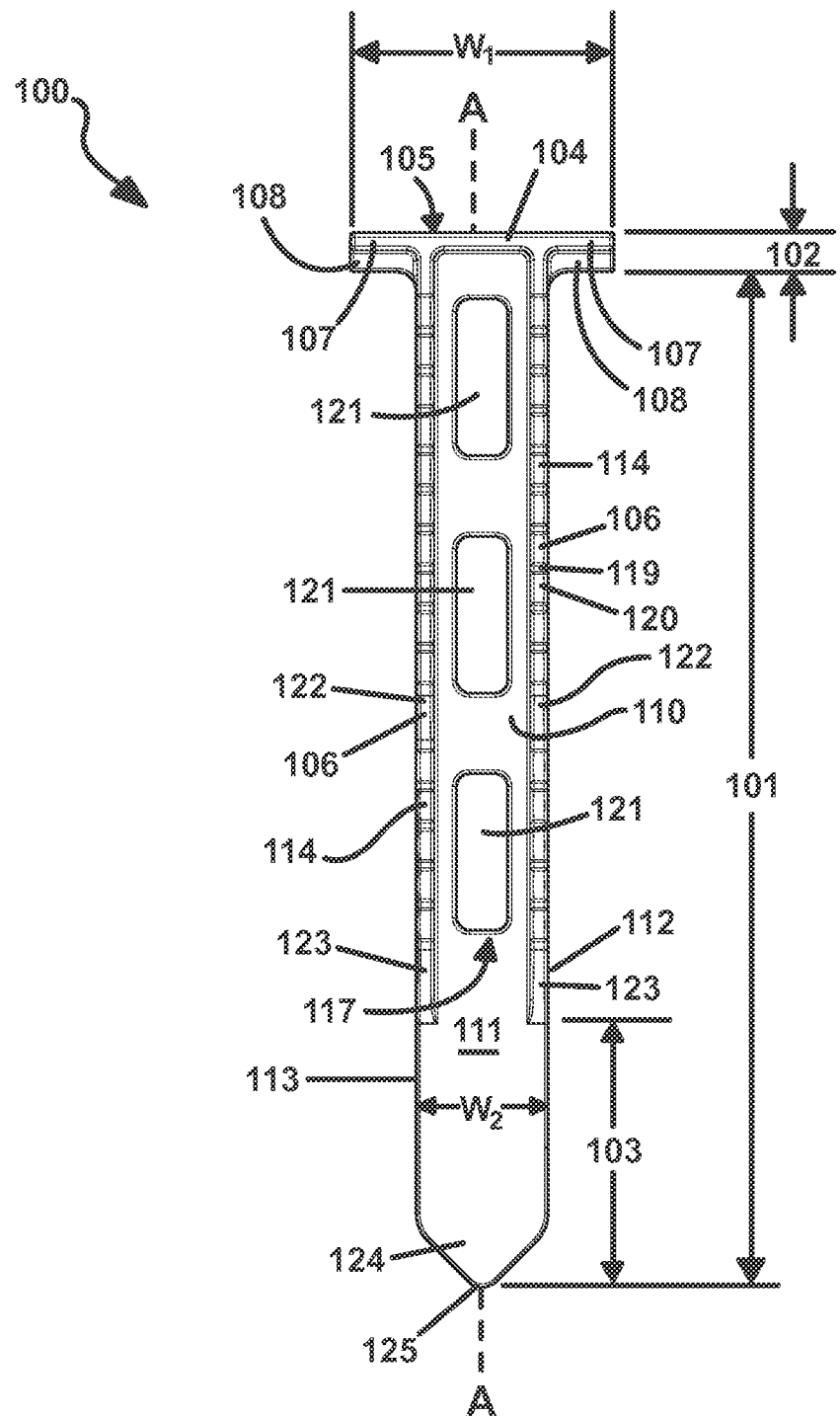
FIG. 2 is a front view of the phase separator of FIG. 1, the rear view of which is a mirror image.

Referring first to FIGS. 1-2 concurrently, a phase separator 100 is illustrated according to an embodiment of the present invention. In the illustrated embodiment, the phase separator 100 is in the shape of an elongated spike that extends longitudinally along axis A-A. The invention, however, is not so limited and the phase separator can take on a wide variety of shapes. The phase separator 100 is preferably an integral unitary structure but, in other embodiments, can be a multi-component structure.

The phase separator 100 is preferably constructed of a dielectric material, and more preferably a rigid dielectric material that can maintain its shape and structural integrity when inserted between the different phase coils of a stator assembly (as will be discussed below in reference to FIGS. 6 to 9). Suitable rigid dielectric materials include, without limitation, a blend of a thermoplastic and glass fibers, thermoplastics, glass, thermoset materials, and combinations thereof. In one embodiment, the phase separator 100 is constructed of a blend of a thermoplastic and glass fibers, wherein the glass fibers preferably make up 30% to 50% of the dielectric material by weight, and most preferably make up 40% of the dielectric material by weight. The thermoplastic is preferably polyphenylene sulphide (PPS), but can be any one of a wide variety of thermoplastics. Alternatively, a host of thermoset materials can be used either alone or in a blend with the glass fibers.

The phase separator 100 comprises an elongated body portion 101 and a head portion 102. The elongated body portion 101 comprises a tip portion 103. The head portion 102 is connected to a proximal end of the elongated body portion 102 and the tip portion is located at a distal end of the elongated body portion 102.

The head portion 102 provides a structural arrangement by which the elongated body portion 101 can be driven into tight spaces between end turns of different phase coils of a stator assembly (as will be discussed below in reference to FIGS. 6 to 9). The head portion 102 has a width $W_1$ that is greater than the width $W_2$ of the elongated body portion 101 so as to provide a structure of increased surface area for contact with a driving member, such as a hammer, punch, or a hand. The invention, however, is not so limited. In alternative embodiments, the head portion 102 may be the same width as the elongated body portion 101, or may even be smaller.

The head portion 102 comprises a head plate 104 that is arranged substantially normal to the longitudinal axis A-A. Thus, a top surface 105 of the head plate 104 provides a contact surface for facilitating insertion of the phase separator 100 into tight spaces. While the top surface 105 is exemplified as a planar surface, it may be convex or concave, in whole or in part, if desired in other embodiments.

The head plate 104 extends beyond a pair of sidewalls 106 of the elongated body portion 101, thereby forming a pair of oppositely arranged flanges 107. A cornice 108 is provided for each flange 107 that connects a bottom surface of the flange 107 to the outer surface of the sidewall 106 of the elongated body portion 101, thereby providing structural integrity to the head portion 102 when subjected to loading and/or impact forces imparted to the top surface 105 of the head plate 104 during insertion of the phase separator 100 between end coils of the stator assembly. The head plate 104 is further supported through its connection to the elongated body portion via the sidewalls 106.

Figure 3:
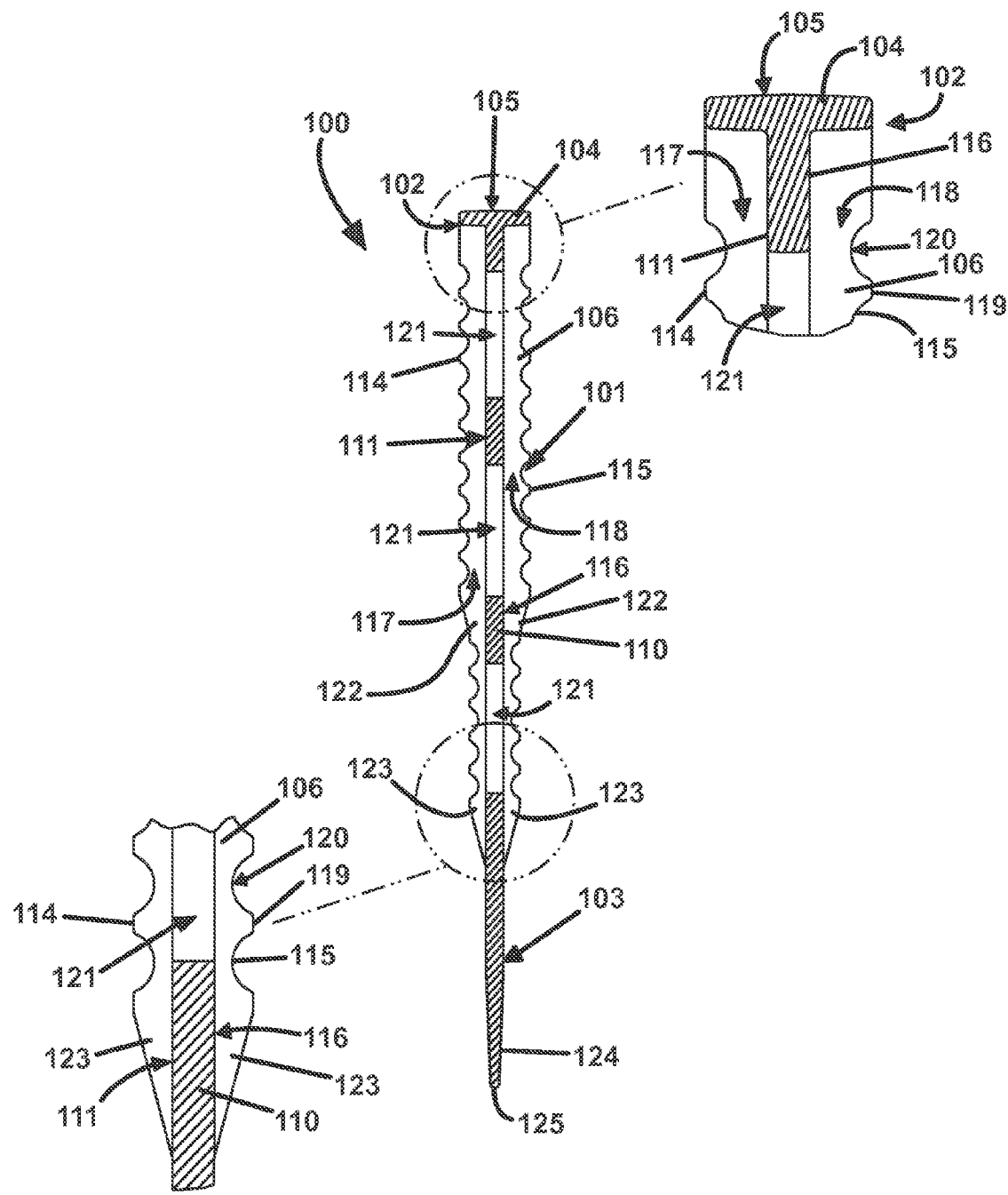
FIG. 3 is a longitudinal cross-sectional view of the phase separator of FIG. 1 taken along axis A-A.

Referring now to FIGS. 1 and 3 concurrently, the elongated body portion 101 comprises an elongated base plate 110 that extends coincident along the longitudinal axis A-A. The base plate 110 is a substantially flat plate that comprises a planar front surface 111 and a planar rear surface 116. The planar rear surface 116 is substantially parallel to the front surface 111. Of course, in alternative embodiments, the base plate 110 may be contoured in the longitudinal and/or transverse directions.

The pair of sidewalls 106 are located along the right and left peripheries 112, 113 of the base plate 110 and longitudinally extend in a substantially parallel relationship. The sidewalls 106 extend from the head portion 102 to the beginning of the tip portion 103. Each of the sidewalls 106 extend beyond both the front surface 111 and the rear surface of the base plate 110 terminating in undulating front edges 114 and undulating rear edges 115. As a result, the front portions of the sidewalls 106 form a first longitudinal channel 117 wherein the front surface 111 of the base plate 110 forms the floor of the first longitudinal channel 117. Similarly, the rear portions of the sidewalls 106 form a second longitudinal channel 118 wherein the rear surface 116 of the base plate 110 forms the floor of the second longitudinal channel 118. When the phase separator 100 is inserted between coils of different phases of a stator assembly (as will be discussed below in reference to FIGS. 6 to 9), the channels 117, 118 create vertical air flow paths through which heated air can escape from between the coils, thereby facilitating cooling of the coils.

Each of the sidewalls 106 terminate in an undulating front edge 114 and an undulating rear edge 115. The undulating edges 114, 115 comprises a plurality of alternating peaks 119 and valleys 120 (only some of which are numerically identified in the drawings to avoid clutter). The valleys 120 are exemplified as semi-circular grooves but can take on other shapes, including without limitation triangular grooves, rectangular grooves, and combinations thereof. The valleys 120 provide a geometry in which individual wires of the coils of the end turns of the stator assembly can nest, thereby further securing and maintaining the phase separator 100 in the desired position and orientation during use.

The peaks 119 and valleys 120 of the undulating front edges 114 of both sidewalls 106 are transversely aligned with one other. Similarly, the peaks 119 and valleys 120 of the undulating rear edges 115 of both sidewalls 106 are also transversely aligned with one other. Of course, the invention is not so limited. Moreover, while the peaks 119 and valleys 120 of the undulating edges 114, 115 are exemplified as being substantially equi-spaced, the invention of course is not so limited.

As mentioned above, the sidewalls 106 extend a height beyond the front and rear surfaces 111, 116 of the base plate 110. The height of the sidewalls 106 may be defined as either the distance between the front surface 111 and the top of the peaks 119 of the front edge 114 or the distance between the rear surface 116 and the top of the peaks 119 of the rear edge 115, depending on which side of the phase separator 100 is at issue. Of course, other distances can be used to define the height of the sidewalls 106. The height of the sidewalls 106 decreases going in a direction from the head portion 102 toward the tip portion 103 (best visible in FIG. 3). Depending on the desired geometry, the height may gradually or incrementally decrease along the entire length of the sidewalls 106 or may decrease only along a portion (or portions) of the length of the sidewalls 106. In the exemplified embodiment, only the middle portions 122 and the distal-most portions 123 of the sidewalls 106 have a tapered height while the remaining portions of the sidewalls 106 have a constant height. By incrementally decreasing the height of the sidewalls 106 moving toward the distal end of the phase separator 100, the phase separator 100 can be more easily wedged into tight spaces between the end turns of the stator assembly, similar to a traditional spike or nail. It should be noted, however, that in alternative embodiments of the phase separator 100, the heights of the sidewalls 106 may not be tapered and/or decreased at all and may be free of undulations.

Referring still to FIGS. 1 and 3 concurrently, the base plate 110 further comprises a plurality of through holes 121. In the exemplified embodiment, there are three through holes 121 arranged along the axis A-A. Of course, any number or configuration of the through holes 121 can be implemented into the phase separator 100, including zero. The total area of the through holes 121 preferably account for 10% to 30% of the surface area of the base plate 110. Of course, the invention is not limited to any particular range. During use, the through holes 121 act as transverse passageways through the phase separator 100 that allow cooling air to better circulate between adjacent end turns of the coils of the stator assembly.

Referring now to FIGS. 1 and 2 concurrently, the distal-most portion of the phase separator 100 is formed into the tip portion 103. The tip portion 103 is formed by a distal portion of the base plate 110 that is free of the sidewalls 106. As a result, the tip portion 103 is a flat thin plate structure. The width $W_1$ of the base plate 110 of the tip portion 103 tapers to a rounded tip/point 125. The thickness of the base plate 110 also tapers at an end portion 124 of the tip portion 103 (see FIG. 3). The geometry of the tip portion 103 not only allows for easy insertion of the phase separator 100 between the end turns but also allows for the tip portion 103 to be at least partially inserted into the slots of the stator core from which the end turns protrude. The tapering of the width and thickness of the end portion 124 allows for limited flexibility for insertion into the slots of the stator core.

In one embodiment, the phase separator 100 has a longitudinal length (measured from the top surface 105 to the tip 125) that is between 6 to 10 times the width $W_2$ of the elongated body portion 101. The tip portion 103 may be about 20% to 30% of the longitudinal length of the phase separator 100. Of course, the invention is not limited to any particular sizes and/or relative dimensions.

Figure 4:
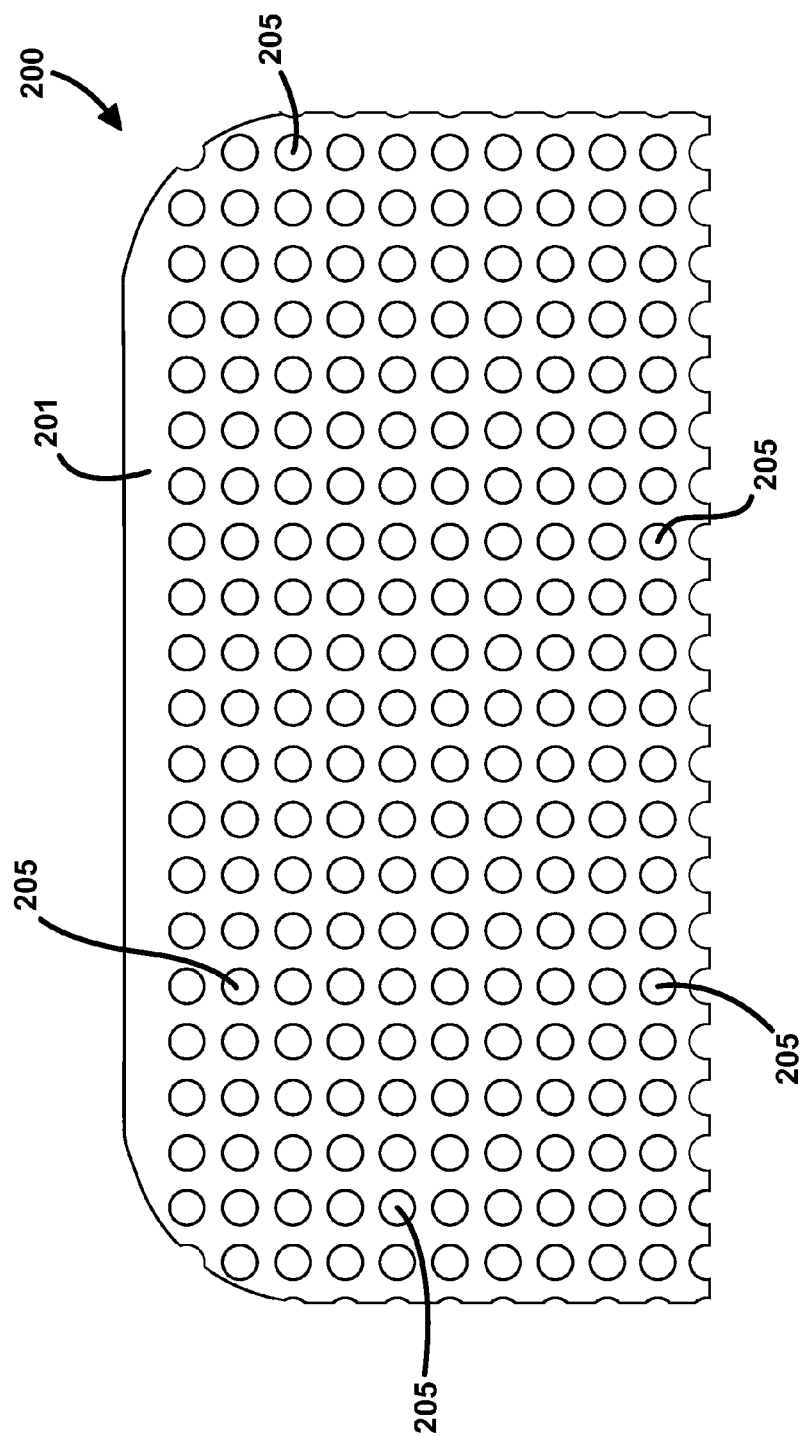
FIG. 4 is a front view of an electric insulation sheet according to an embodiment of the present invention.

Referring now to FIG. 4, an electric insulating sheet 200 is illustrated according to an embodiment of the present invention. When positioned between end turns of adjacent coils of different phases, the electric insulating sheet 200 electrically insulates the end turns from one another. The electric insulating sheet 200 is a flexible dielectric material. Although a variety of materials can be used to create the electric insulating sheet 200, the electric insulating sheet 200 is preferably a laminate comprising a thermoplastic film and a layer of a ceramic paper mat. Of course, other flexible dielectric materials can be used to create the electric insulating sheet 200, including without limitation, a fiber impregnated paper, a paper polyester laminate, MYLAR, NOMEX, and combinations thereof.

The electric insulating sheet 200 is a thin flexible dielectric sheet having a first major surface 201 and a second major surface (not visible) opposite the first major surface 201. A plurality of through holes 205 (only some of which are numbered to avoid clutter) are provided in the electric insulating sheet 200 that form passageways through the electric insulating sheet 200 for allowing cooling air to flow therethrough. Thus, when the electric insulating sheet 200 is inserted between the end turns of adjacent coils of different phases of the stator assembly, the through holes 205 allow air to circulate about the coils, thereby facilitating improved cooling of the end turns. The through holes 205 can be formed into the electric insulating sheet 200 by a punching process, die cutting process, or any other suitable process that can cut the laminate.

The through holes 205 are circular in shape and are arranged in tightly-spaced rows and columns. The invention, however, is not so limited. The through holes 205 can take on a wide variety of shapes and arrangements. Preferably, the through holes 205 are closely grouped so as to account for 50% to 90% of the surface area of the electric insulating sheet 200.

Figure 5:
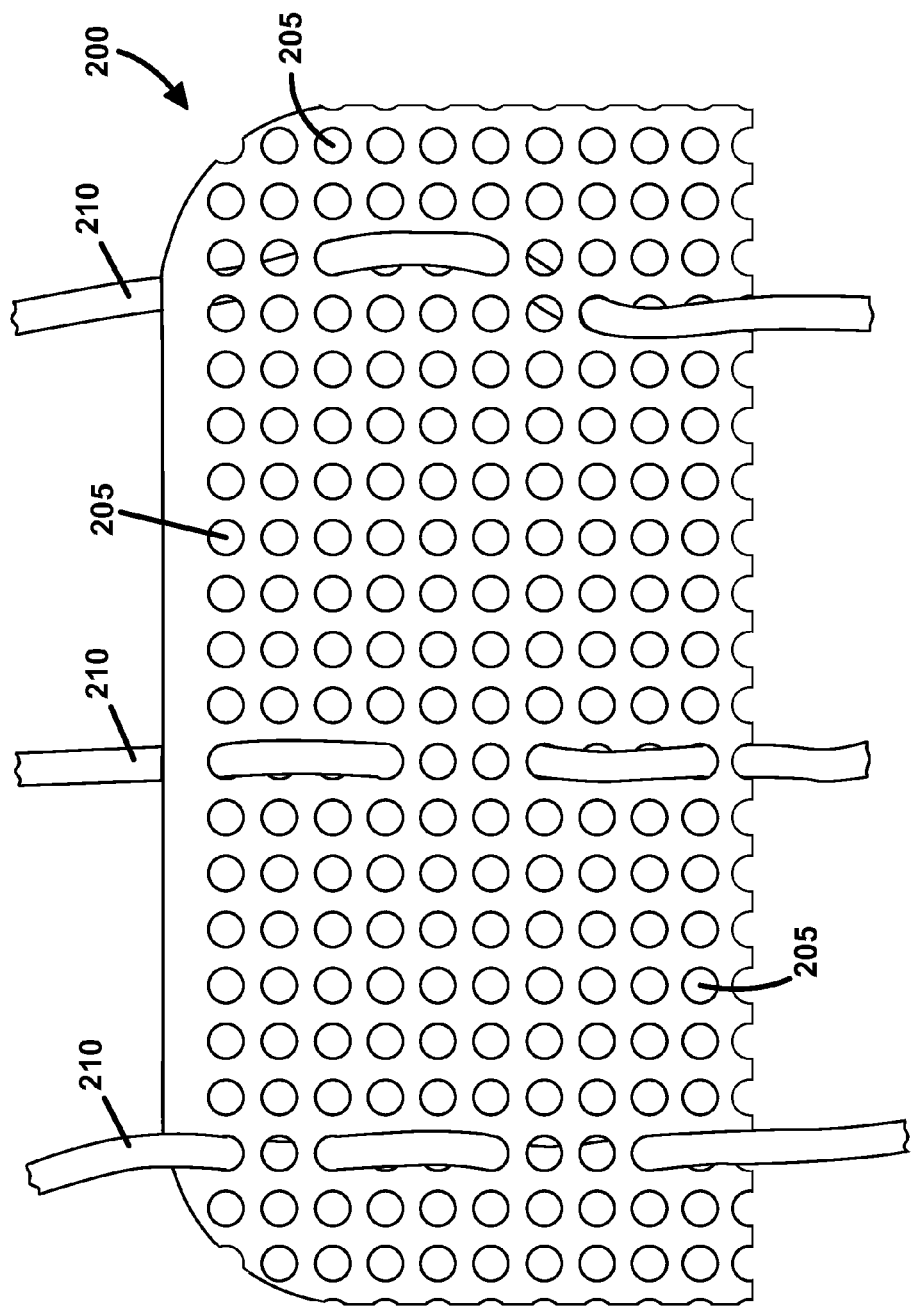
FIG. 5 is a front view of the electric insulation sheet of FIG. 4 having dielectric cords laced therethrough according to an embodiment of the present invention.

Referring now to FIG. 5, the electric insulating sheet 200 is illustrated having a plurality of flexible cords 210 laced through the through holes 205 of the electric insulating sheet 200. While the cords 210 are exemplified as being secured to the electric insulating sheet 200 by lacing the cords 210 through the through holes 205, the cords 210 can be secured to the electric insulating sheet 200 by other means. For example, in alternative embodiments, the cords 210 can be adhered, thermally welded, sewed, or otherwise secured to the electric insulating sheet 200.

The cords 210 are secured to the electric insulating sheet 200 so that a length of the cords 210 sufficient to wrap around one of the end turns of the stator assembly extends from the electric insulating sheet 200. As will be discussed below, the cords 210 are used to secure the electric insulating sheets 200 to the end turns of the stator assembly to prevent dislodging and/or unwanted movement of the electric insulating sheet 200 once it is inserted between adjacent end turns of the coils to electrically insulate the end turns from each other. While a plurality of cords 210 are exemplified, a single cord 210 can be used that is wound around the end turn and laced through the through holes 205 multiple times. The cords 210 are constructed of a dielectric material, such as polyester. Other suitable materials for the cords 210 include braided polyester and other thermoplastics and thermoset materials.

Figure 6:
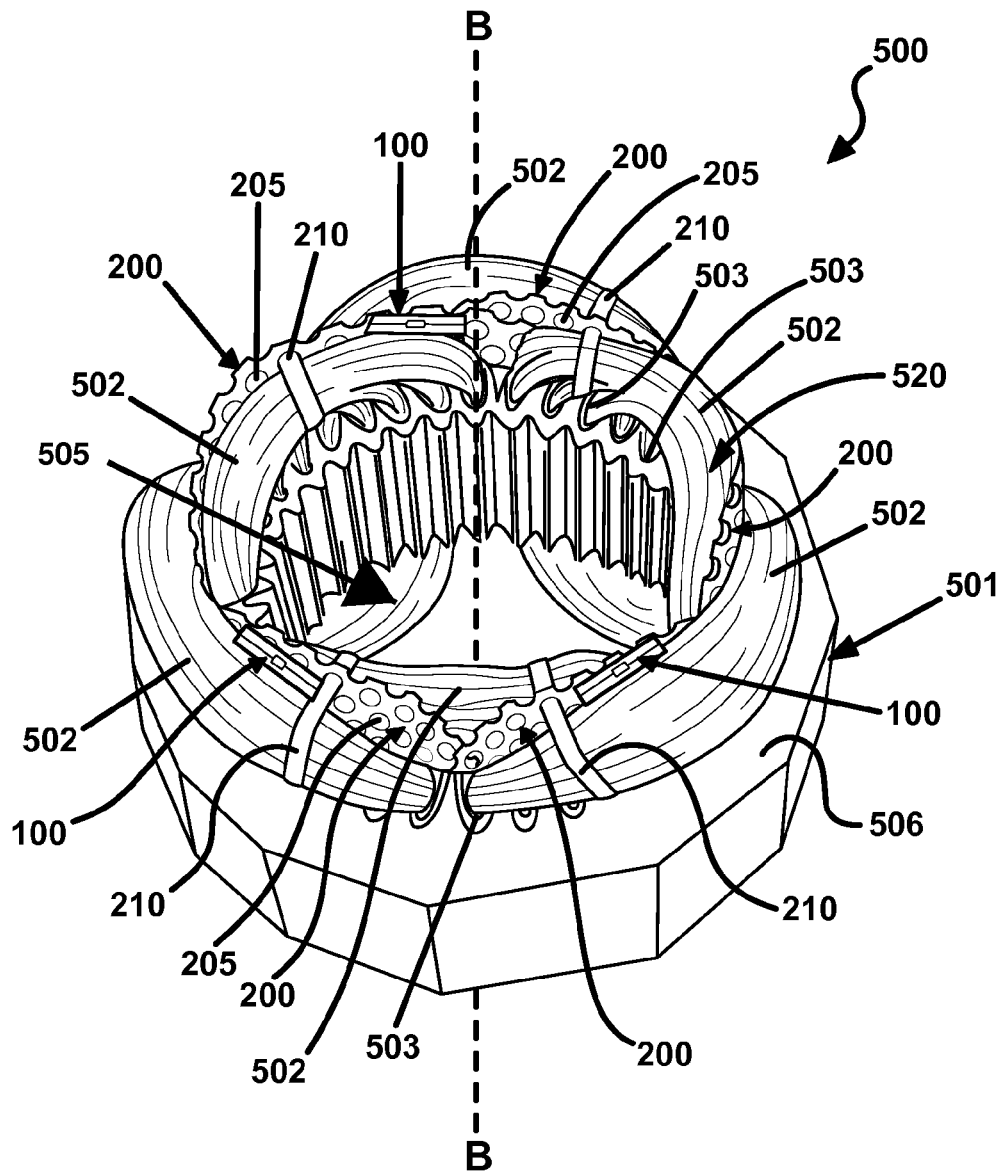
FIG. 6 is an isometric view of a stator assembly according to an embodiment of the present invention.

Referring now to FIG. 6, a stator assembly 500 is illustrated according to an embodiment of the present invention wherein the phase separator 100 of FIGS. 1-3 and the electric insulating sheet 200 of FIGS. 4-5 are inserted between the end turns 502 of coils of different phases. While the stator assembly 500 is exemplified as incorporating both the phase separator 100 and the electric insulating sheet 200, it is to be understood that, in alternative embodiments, the stator assembly 500 may only incorporate one of the phase separator 100 or the electric insulating sheet 200 if desired. Furthermore, while a two point three phase stator is exemplified, the invention is not so limited and can be used in any multi-phase stator having any number of points.

The stator assembly 500 comprises a stator core 501 having a central bore 505. The stator core 501 is a ring-like structure formed about a central axis B-B. The stator core 501 has a top end 506 and a bottom end (not visible). A plurality of axially-extending circumferentially-spaced slots 503 are formed through the stator core 501. The slots 503 form passageways through the stator core 501 from the top end 506 to the bottom end (not visible). A stator winding 520 composed of at least two different phase coils formed of magnet wire are wound through the slots 503 and form groups of end turns 502 extending axially from the top end 506 and the bottom (not visible) of the stator core 501.

During the assembly process of the stator assembly 500, electric insulating sheets 200 are inserted between adjacent end turns 502 of different phases, as illustrated in FIGS. 6-9. The cords 210 are preferably pre-laced through the through holes 205 of the electric insulating sheets 200 and, thus, are laced to the electric insulating sheets 200 (as shown in FIG. 5) during the insertion of the electric insulating sheets 200. Once the electric insulating sheets 200 are in proper position, the cords 210 are wrapped around one or more of the end turns 502 of the stator assembly 500 and then secured so that they can not unwind. The cords 210 can be secured by merely tying the ends of each cord 210 together or through other means that would prohibit the cords 210 from becoming unwound from the end turns 502. For example, the end(s) of the cords 210 can be secured to the stator core 501 by clamping, tying, pinching, etc., or can be secured to the electric insulating sheets 200 by adhering, thermal welding, sonic welding or other connection processes. One or more cords 210 can be used for each electric insulating sheet 200 as necessary.

Because the electric insulating sheets 200 are flexible, the electric insulating sheets 200 are secured tightly against the end turns 502 to which they are tied. However, the through holes 205 of the electric insulating sheets 200 allow heat build-up within the end turns 502 to escape. Thought of another way, when the electric insulating sheets 200 are in place between adjacent end turns 502 and properly secured to the end turns 502 by the cords 210, the through holes 205 of the electric insulating sheets 200 form passageways between the adjacent end turns 502 that allow cooling air to more effectively circulate within the space and over the wires of the end turns 502.

While the through holes 205 of the electric insulating sheets 200 provide for improved cooling of the end turns 502, the through holes 205 also present passageways through which the adjacent end turns 502 of different phases can potentially make contact with one another. This is clearly an undesirable danger In order to alleviate this potential concern and to provide additional space for air to circulate between adjacent end turns 502, the phase separators 100 are inserted between the adjacent end turns 502 once the electric insulating sheets 200 are in place. More specifically, the phase separators 100 are inserted between a major surface of the electric insulating sheets 200 and one of the adjacent end turns 502. The phase separators 100 may be inserted on either side of the electric insulating sheets 200, as desired. As discussed above, the phase separators 100 are structures having sufficient structural rigidity so as to maintain their shape and the desired physical separation between adjacent end turns 502. Thus, proper positioning of the phase separators 100 eliminates the danger of adjacent end turns 502 from making contact with one another through the through holes 205 of the electric insulating sheets 200.

With reference to FIGS. 1 and 6 concurrently, the phase separators 100 are inserted between the adjacent end turns 502 in an orientation so that the tip portions 103 of the phase separators 100 lead. The head portion 102 provides a structure to which the force necessary to drive the phase separators 100 between the end coils 502 can be applied by manual pushing, hammering, punching, or the like. As more of the elongate body portions 101 of the phase separators 100 are inserted between the end turns 502, the increasing height of the sidewalls 106 increases the amount of separation created between the end turns 502. Preferably, the phase separators 100 continue to be inserted between the end turns 502 of the stator assembly until at least a portion of the tip portions 103 of the phase separators 100 are inserted into the slots 503 of the stator core 501. Inserting the tip portions 103 of the phase separators 100 into the slots 503 helps ensure that the phase separators 100 remain properly oriented and in place during further handling and assembly of the stator assembly 500, which includes subsequent varnishing and annealing. Furthermore, as discussed above, the tip portions 103 of the phase separators 100 are tapered (in both width and thickness) so that they have a greater degree of flexibility than the remaining portion of the phase separators 100. This increased flexibility of the tip portions 103 allows the tip portions 103 of the phase separators 100 to be more easily inserted into the slots 503 of the stator core 501, even when the phase separators 100 may not be perfectly aligned with the slots 503.

Furthermore, when the phase separators 100 are inserted between the end turns 502 as described above, the undulating edges 114, 115 of the sidewalls 106 engage the wires of the coils of the end turns 502, thereby further preventing the phase separators 100 from becoming unintentionally dislodged or moved out of their proper position. This engagement is accomplished by the wires of the coils of the end turns 502 nesting within the valleys/grooves 120 of the undulating edge 114 or 115 with which it is in contact. Thought of another way, the peaks 119 of the undulating edge 114 or 115 protrude into the indentations between adjacent wires in the coils.

The phase separators 100 are preferably inserted between the adjacent end turns 502 of the stator assembly 500 so that the phase separators 100 are oriented so that their longitudinal axis A-A extend away from the top ends 506 of the stator core 501. As a result, the head portions 102 of the phase separators 100 remain accessible.

When the phase separators 100 are properly positioned and oriented as described above, the phase separators 100 further facilitate air circulation (and thus cooling) between the end turns 502 by virtue of the through holes 121 and the longitudinal channels 117, 118. The through holes 121 of the phase separators 100 create passageways between the electric insulating sheet 200 with which they are in contact and the adjacent end turn 502 with which they are in contact, thereby allowing air to more effectively circulate between the end turns 502. As a result of the through holes 121, the phase separators 100 do not significantly block the through holes 205 of the electric insulating sheets 200. Additionally, the longitudinal channels 117, 118 of the phase separators 100 create vertical passageways that allow heated air to rise therein and exit the space between the adjacent end turns 502, similar to a chimney. As discussed above, any number of phase separators 100 can be used. The exact number and positioning of the phase separators 100 within the stator assembly 500 will depend on the specific number and arrangement of the end turns 502 and will be determined on a case-by-case basis.

Once the electric insulating sheets 200 and phase separators 100 are properly inserted within the stator assembly 500 as discussed above, the entire stator assembly 500 is dipped in a varnish and subsequently fired, thereby giving the structure additional rigidity.

Figure 7:
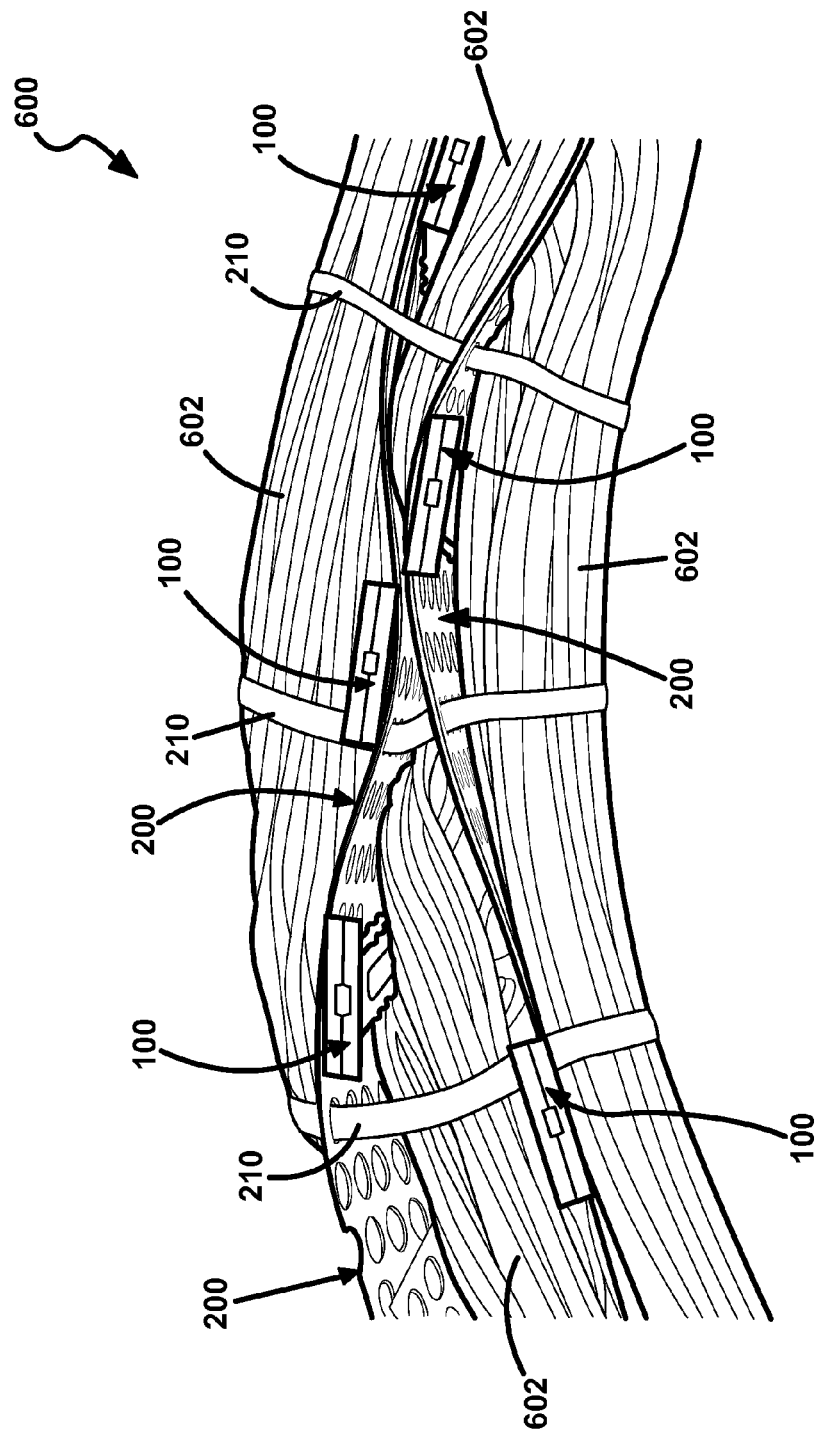
FIG. 7 is a top view of a portion of a stator assembly according to an embodiment of the present invention.
Figure 8:
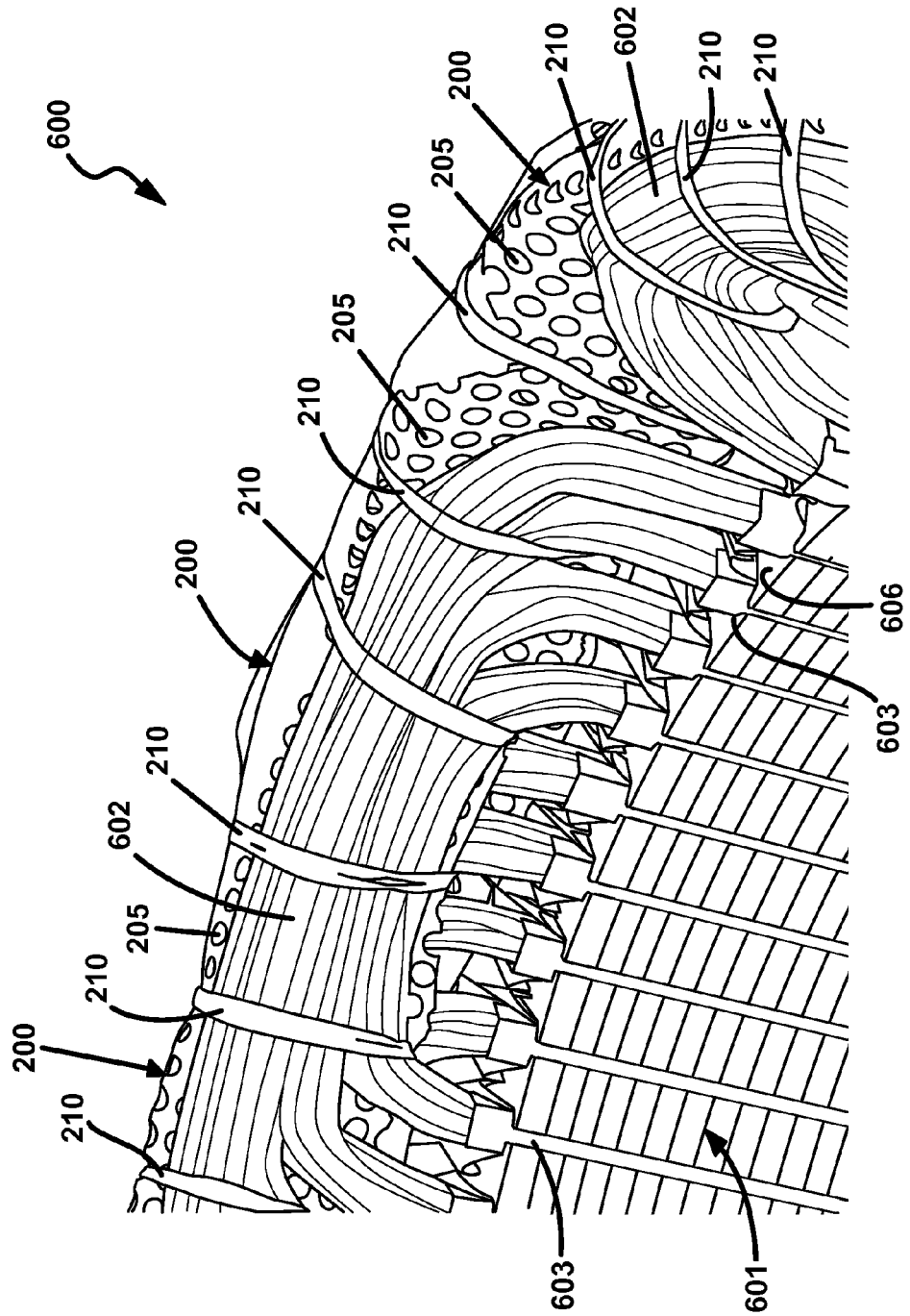
FIG. 8 is a perspective view of a portion of a stator assembly according to an embodiment of the present invention taken from the central bore of the stator core.

Referring now to FIGS. 7 and 8 concurrently, a stator assembly 600 is illustrated according to an alternative embodiment of the present invention. The stator assembly 600 is similar to the stator assembly 500 with the exception that the stator assembly 600 comprises three radial sets of end turns 602 rather than two.

The stator assembly 600 comprises a stator core 601 having a central bore. The stator core 601 has a top end 606 and a bottom end (not visible). A plurality of axially-extending circumferentially-spaced slots 603 are formed through the stator core 601. The slots 603 form passageways through the stator core 601 from the top end 606 to the bottom end (not visible). A stator winding composed of at least two different phase coils formed of magnet wire are wound through the slots 603 and form groups of end turns 602 extending axially from the top end 106 and the bottom end (not visible) of the stator core 601.

The electric insulating sheets 200 are inserted between and secured to the adjacent end turns 602 of different phases as discussed above in relation to FIG. 6. The phase separators 100 are also inserted between the adjacent end turns 602 of different phases as discussed above in relation to FIG. 6. However, as can best be seen in FIG. 7, the phase separators 100 are positioned on both sides of some of the electric insulating sheets 200 as needed.

Moreover, as can be seen, the cords 210 that are used to secure the electric insulating sheets 200 in place are wound around multiple end turns 602 of different radial sets. The cords 210 are also laced through multiple electric insulating sheets 200. By wrapping the cords 210 around end turns 602 of multiple radial sets, a more rigid, compact and robust assembly is formed of the end turns 602. Despite the cords 210 being used to hold (and possibly pull) the end turns 602 of different radial position together, the phase separators 100 and the electric insulating sheets 200 maintain electrical isolation and sufficient space between the end turns 602. Thus, the end turns 602 of the stator assembly 600 are maintained in a compact and robust arrangement that helps prevent damage during further processing while still achieving improved cooling of the end turns 602 during use.

Figure 9:
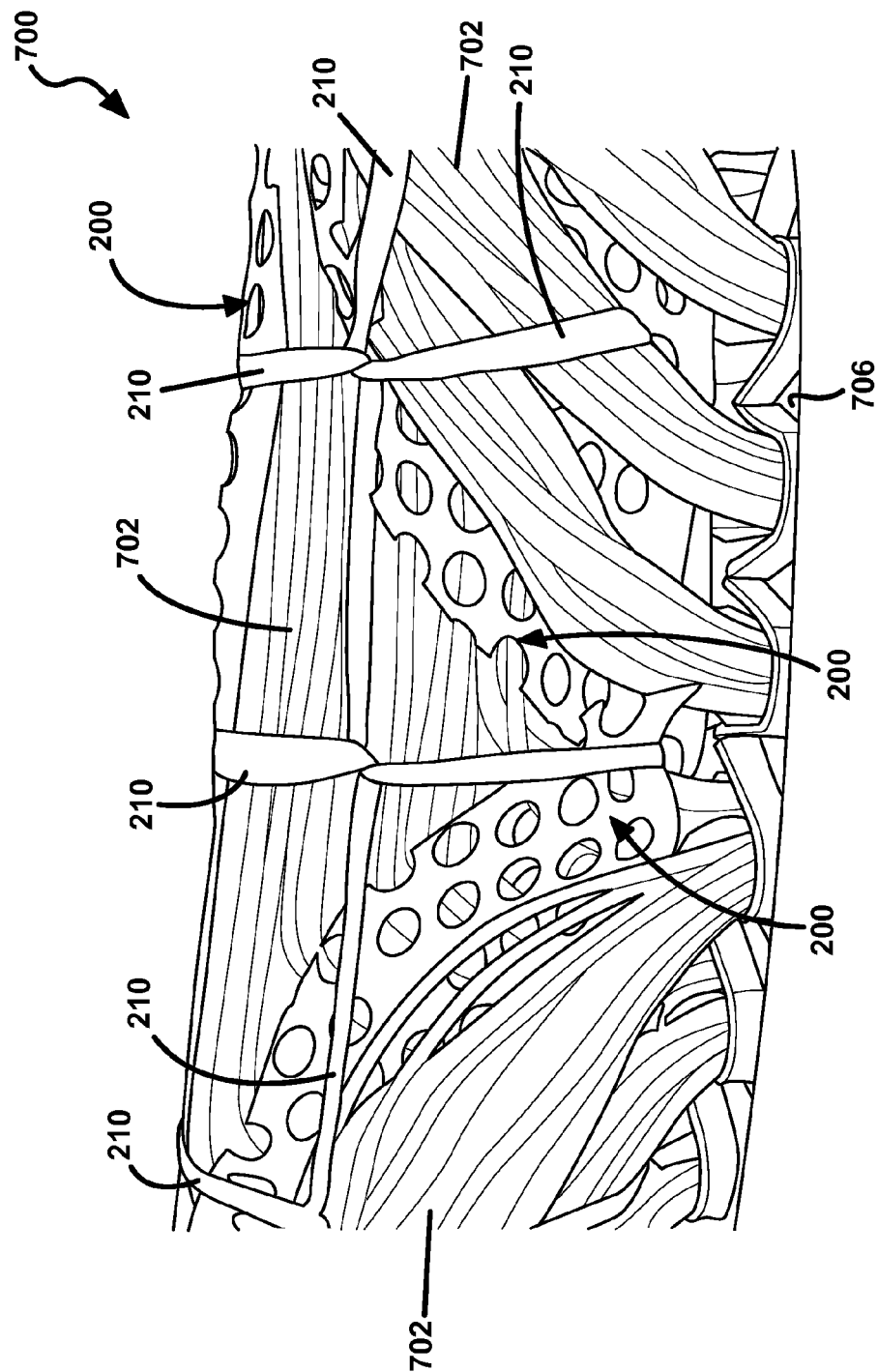
FIG. 9 is a perspective view of a portion of a stator assembly according to an embodiment of the present invention taken from exterior of the stator core.

Referring now to FIG. 9, a second alternative embodiment of a stator assembly 700 is illustrated according to an embodiment of the present invention. The stator assembly 700 is identical to the stator assembly 600 with the exception that the cords 210 of different electric insulating sheets 200 are interlaced together. In the exemplified embodiment, the cords 210 of electric insulating sheets 200 located between different radial sets of end turns 702 are interlaced. The interlacing of the cords 210 of different electric insulating sheets 200 achieves the same benefits of having the end turns 702 of the stator assembly 700 being maintained in a compact and robust arrangement that helps prevent damage during further processing while also achieving improved cooling of the end turns 702 during use.

Figure 10:
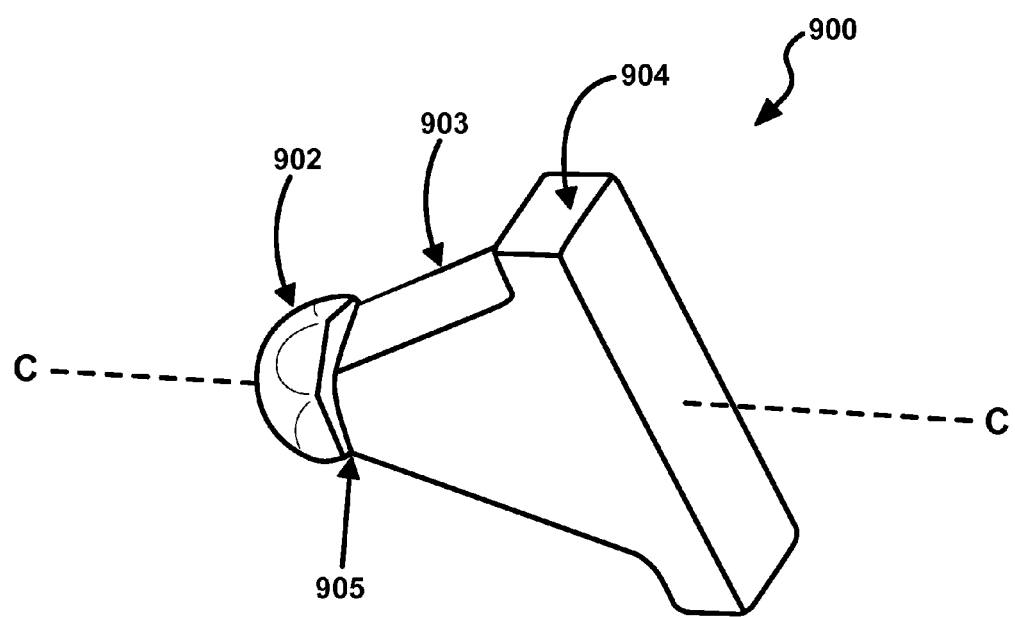
FIG. 10 is an isometric view a phase separator according to an alternative embodiment of the present invention.

Referring now to FIG. 10, an alternative embodiment of a phase separator 900 is illustrated according to the present invention. The phase separator 900 is a rigid structure that is constructed of the same material as the phase separator 100 discussed above. The phase separator 900 is similarly utilized to achieve adequate spacing between adjacent end turns of a stator assembly. As will be discussed below in relation to FIG. 12, the phase separator 900 is specially designed to operably engage a specially designed electric insulating sheet 800 (FIG. 11) through a combination of translation and rotation.

The phase separator 900 extends along a longitudinal axis C-C. The phase separator 900 can be an integral unitary structure or can be constructed as a multi-component structure. The phase separator 900 comprises a head portion 902, a neck portion 905, a body portion 903 and a base portion 904. The head portion 902 is designed to have a special geometry that can translate/slide through the through holes 805 of the electric insulating sheet 800 when in a first rotational orientation about the longitudinal axis C-C and is prohibited from translating/sliding through the through holes 805 of the electric insulating sheet 800 when in a second rotational orientation about the longitudinal axis C-C. In the exemplified embodiment, the head 902 is a bulbous structure having a hexagonal transverse cross-sectional shape. In other embodiments, the head 902 may have a transverse cross-sectional shape that is triangular, oval, rectangular, or any other polygon. In fact, the head 902 may have any non-circular transverse cross-sectional shape.

The neck portion 905 is the transition section located between the head portion 902 and the body section 903. The neck portion 905 is preferably thinner (i.e., has a smaller cross-sectional area) than both the head portion 902 and the body portion 903. The body portion 903 extends from the neck portion 905 to the base portion 904. The transverse cross-sectional area of the body portion 903 increases from the neck portion 905 to the base portion 904. As will be discussed in greater detail below, by designing the body portion 903 to have a larger transverse cross-sectional area than the neck portion 905 (and the head portion 902), the body portion 903 can not slide through the through holes 805 of the electric insulating sheets 800.

The base portion 904 has the greatest transverse cross-sectional area of the phase separator 900. However, in alternative embodiments, the base portion 904 may be omitted all together or be a mere end portion of the body portion 903. The base portion 904 preferably has an increased size because it contacts the end turns of the stator assembly when used in conjunction with the electric insulating sheet 800 to electrically insulate adjacent end turns of different phase coils in a stator assembly according to the present invention.

Figure 11:
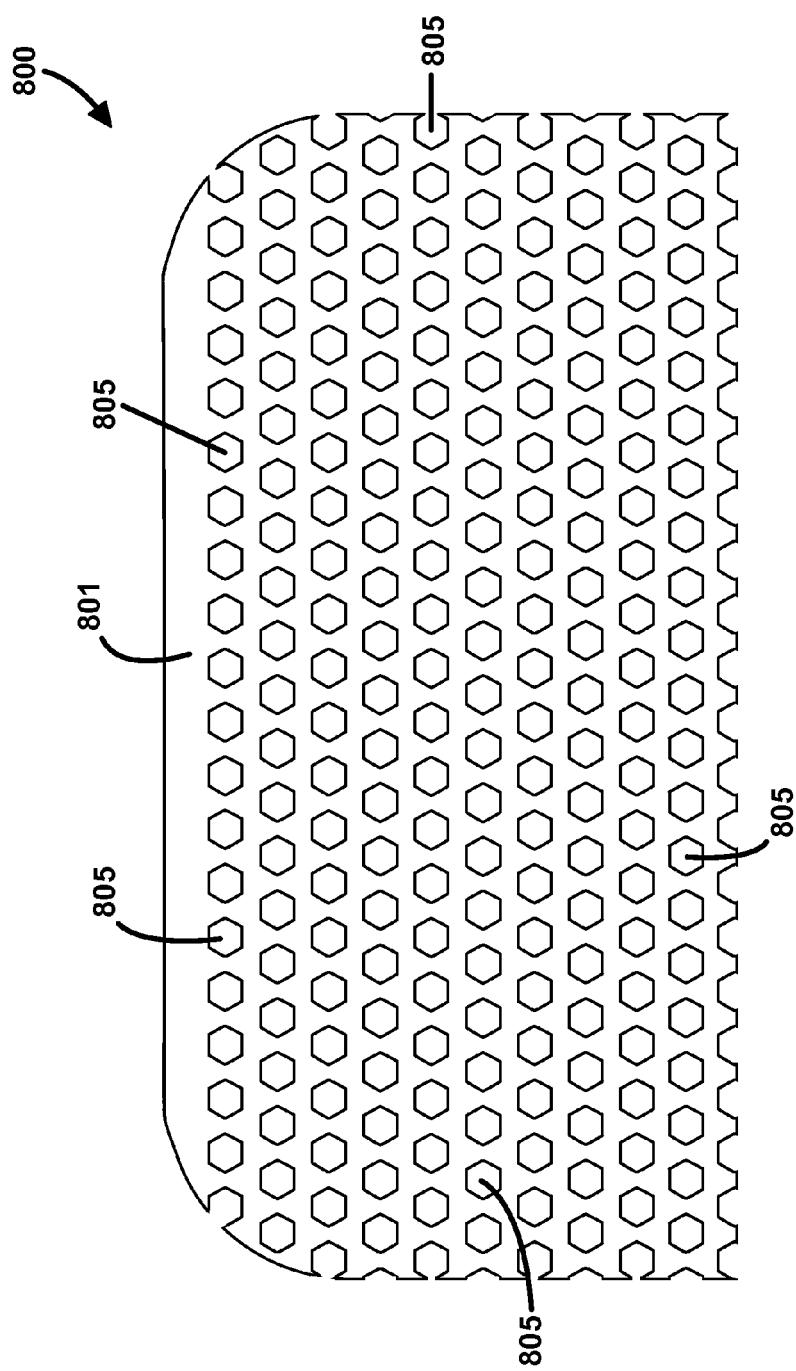
FIG. 11 is a front view of an electric insulation sheet according to an alternative embodiment of the present invention.

Referring now to FIG. 11, an alternative embodiment of a electric insulating sheet 800 is illustrated according to the present invention. The electric insulating sheet 800 is identical to the electric insulating sheet 200 discussed above from both a structural and functional aspect with the exception that the through holes 205 have a hexagonal shape. In other embodiments, the through holes 805 may have a shape that is triangular, oval, rectangular, or any other polygon. In fact, the through holes 805 may have any non-circular transverse cross-sectional shape. Preferably, the size and shape of the through holes 805 corresponds to the size and shape of the transverse cross-sectional area of the head portion 902 of the phase separator 900.

Figure 12:
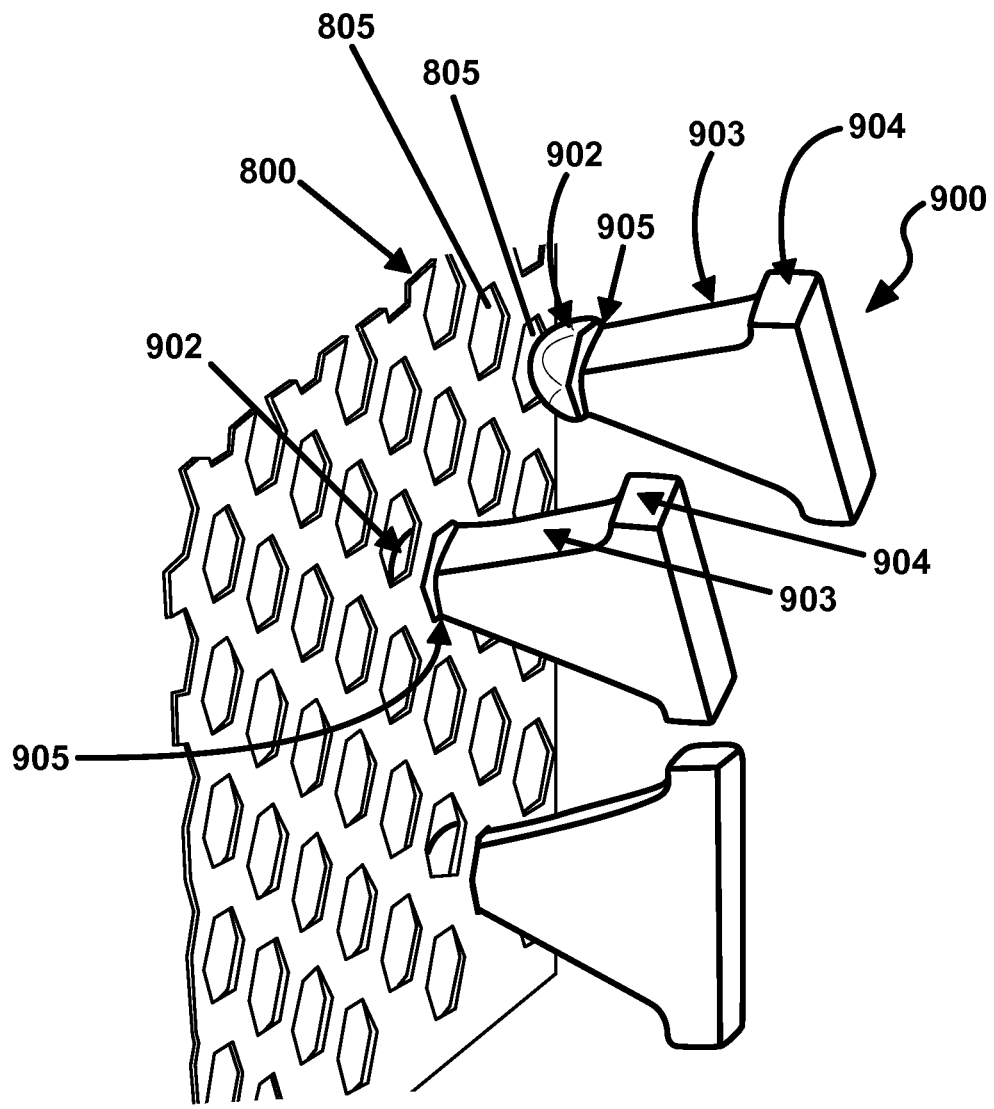
FIG. 12 is a perspective view of the phase separator of FIG. 10 operably coupled to the electric insulation sheet of FIG. 11 according to an embodiment of the present invention.

Referring now to FIG. 12, the operable engagement of the phase separator 900 to the electric insulating sheet 800 will be described. When the electric insulating sheet 800 and the phase separator 900 are incorporated into a stator assembly to electrically insulate adjacent end turns of different phase coils, the electric insulating sheet 800 is inserted between and secured to the adjacent end turns as discussed above with respect to the electric insulating sheet 200. Once the electric insulating sheets 800 are in place, the phase separators 900 are positioned in the desired locations adjacent to and in alignment with the through holes 805 of the electric insulating sheets 800. More specifically, the phase separators 900 are positioned adjacent the electric insulating sheet 800 so that their longitudinal axis C-C intersect the center of the through holes 805. The phase separators 900 are oriented in first rotational position about their longitudinal axis C-C so that the hexagonal transverse cross-sectional shape of the head portion 902 can freely pass through the hexagonal shaped through holes 805 of the electric insulating sheet 800 in an unobstructed manner. The phase separators 900 are then translated toward the electric insulating sheets 800 until the head portions 902 pass through the through holes 805 of the electric insulating sheet 800. The larger body portions 903 of the phase separators 900 prevent over insertion of the phase separators 900 as the body portions 903 are too large to pass through the through holes 805.

Once the head portions 902 are fully inserted, the phase separators 900 are rotated about the longitudinal axis C-C until the head portions 902 are in a second orientation that prohibits the head portions 902 from sliding back out of the hexagonal through holes 805 of the electric insulating sheet 800 due to misalignment of the hexagonal transverse cross-sectional areas of the head 902 of the phase separators 900 and the hexagonal through holes 805 of the electric insulating sheet 800. In other words, when the phase separators 900 are in the second rotational orientation, the head portion 902 can not pass through the through holes 805 because of contact between the head portions 902 and the electric insulating sheets 800. When the phase separators 900 are operably engaged to the electric insulating sheets 800 as described above, the base portions 905 of the phase separators 900 contact the coils of the adjacent end turns and, thus, maintain the desired separation between the adjacent end turns. As a result, the coils of the adjacent end turns are prohibited from contacting one another through the through holes 805 of the electric insulating sheets 800.

While the exemplified embodiment of the phase separators 900 are locked into engagement with the electric insulating sheets 800 via a twist lock geometry, engagement of the phase separators to the electric insulating sheets 800 can be accomplished in other ways. For example, the head portions 902 and the through holes 805 can be designed so that a pop-lock engagement, a snap-fit engagement, a threaded engagement, a channel slide-lock engagement, and/or combinations thereof can be used.

While the invention has been described and illustrated in detail, various alternatives and modifications will become readily apparent to those skilled in the art without departing from the spirit and scope of the invention.

What is claimed is:

1. A stator assembly comprising:
   a stator core having a plurality of slots;
   at least two coils of different phases wound on the stator core through the slots and having an end turn that extends from the stator core;
   one or more separator members positioned between adjacent end turns of the coils and maintaining space between the adjacent end turns, the separator members constructed of a rigid dielectric material;
   one or more electrically insulating sheets constructed of a flexible dielectric material positioned between the adjacent end turns of the coils;
   wherein the rigid dielectric material is different than the flexible dielectric material;
   wherein the rigid dielectric material is more rigid than the flexible dielectric material; and
   wherein the one or more separator members are in the form of a spike.

2. The stator assembly of claim 1 wherein the one or more separator members comprise a head portion, an elongated body portion, and a tip portion inserted within the slots of the stator core.

3. The stator assembly of claim 2 wherein the one or more separator members comprise one or more through holes forming passageways between the adjacent end turns.

4. The stator assembly of claim 2 wherein the one or more separator members comprise one or more walls terminating in an undulating edge in which wires of the adjacent end turns nest.

5. The stator assembly of claim 2 wherein the one or more separator members comprise a longitudinal channel.

6. The stator assembly of claim 2 wherein the tip portion is a flat plate and the elongated body portion comprises a pair of walls having a tapered height that decreases in a direction from the head portion to the tip portion.

7. The stator assembly of claim 1 wherein the one or more electrically insulating sheets comprise a plurality of through holes, the through holes of the one or more electrically insulating sheets forming passageways between the adjacent end turns.

8. The stator assembly of claim 1 wherein the one or more separator members are constructed of a thermoplastic blended with glass fibers.

9. The stator assembly of claim 1 further comprising:
   the one or more electrically insulating sheets comprising a plurality of through holes, the through holes of the one or more electrically insulating sheets forming passageways between the adjacent end turns;
   wherein the one or more separator members comprise head portions inserted into the through holes of the one or more electrically insulating sheets, a body portion of the one or more separator members protruding from the one or more electrically insulating sheets;
   wherein the head portion of the one or more separator members are secured within the through holes of the one or more electrically insulating sheets; and
   wherein the head portions of the one or more separator members are sized and shaped so that: (i) when the head portions are in a first rotational orientation, the head portions can pass through the through holes of the one or more electrically insulating sheets in a substantially unobstructed manner; and (ii) when the head portions are in a second rotational orientation, the head portions are prohibited from passing through the through holes of the one or more electrically insulating sheets.

10. A separator member for maintaining separation between adjacent end turns of a multi-phase winding in a stator assembly, the separator member comprising:

a body portion;

a head portion connected to a proximal end of the body portion;

a tip portion at a distal end of the body portion, the body portion being elongated along an axis extending from the proximal end to the distal end;

wherein the separator member is constructed of a rigid dielectric material;

wherein the body portion comprises one or more through holes; and wherein the body portion comprises a pair of walls terminating in undulating edges defining a longitudinal channel, the through holes being located on a floor of the longitudinal channel.

11. The separator member of claim 10 wherein at least a portion of the pair of walls have a tapered height that decreases in a direction toward the distal end.

12. The separator member of claim 10 wherein the body portion comprises an elongated base plate, the pair of walls protruding from a major surface of the elongated base plate, the pair of walls extending from the heading portion to a beginning of the tip portion, the tip portion being free of the pair of walls and having a tapered lateral width; and wherein the elongated base plate comprises the plurality of through holes.

13. The separator member of claim 12 wherein the head portion comprises a head plate oriented substantially orthogonal to the elongated base plate.

14. A stator assembly comprising:

a stator core having a plurality of slots;

at least two coils of different phases wound on the stator core through the slots and having an end turn that extends from the stator core;

one or more electrically insulating sheets comprising a plurality of through holes, the sheets positioned between adjacent end turns of the coils so that the through holes of the sheets form passageways between the adjacent end turns;

one or more cords secured to the sheets and wrapped around at least one of the adjacent end turns; and wherein the cords are secured to the sheets by lacing the cords through the through holes of the sheets.

15. The stator assembly of claim 14 wherein the cords are wrapped around a plurality of end turns located at different radial distances from an axis of the stator core.

16. A stator assembly comprising:

a stator core having a plurality of slots;

at least two coils of different phases wound on the stator core through the slots and having an end turn that extends from the stator core;

one or more electrically insulating sheets comprising a plurality of through holes, the sheets positioned between adjacent end turns of the coils so that the through holes of the sheets form passageways between the adjacent end turns;

one or more cords secured to the sheets and wrapped around at least one of the adjacent end turns; and wherein the cords secured to different sheets are interlaced together.

17. A stator assembly comprising:

a stator core having a plurality of slots;

at least two coils of different phases wound on the stator core through the slots and having an end turn that extends from the stator core;

one or more separator members positioned between adjacent end turns of the coils, the separator members comprising a first dielectric material;

one or more electrically insulating sheets comprising a second dielectric material positioned between the adjacent end turns of the coils;

wherein the first dielectric material is different than the second dielectric material;

wherein the first dielectric material is more rigid than the second dielectric material; and wherein the one or more separator members are in the form of a spike.

* * * * *